United States Patent [19]

Torres

[11] Patent Number: 5,040,131

[45] Date of Patent: Aug. 13, 1991

[54] GRAPHICAL PROCESSING

[75] Inventor: Robert J. Torres, Colleyville, Tex.

[73] Assignee: International Business Machines Corporation, Armonk, N.Y.

[21] Appl. No.: 432,001

[22] Filed: Nov. 3, 1989

Related U.S. Application Data

[63] Continuation-in-part of Ser. No. 137,137, Dec. 23, 1987, abandoned.

[51] Int. Cl.[5] .......... G06F 15/403

[52] U.S. Cl. .......... 364/521; 364/518

[58] Field of Search .......... 364/518, 521, 900, 300; 340/709; 379/204

[56] References Cited

U.S. PATENT DOCUMENTS

| | | | |
|---|---|---|---|
| 4,419,756 | 12/1983 | Cheng-Quispe et al. | 364/900 X |
| 4,648,062 | 3/1987 | Johnson et al. | 364/900 |
| 4,653,090 | 3/1987 | Hayden | 379/204 |
| 4,688,195 | 8/1987 | Thompson et al. | 364/300 |
| 4,835,735 | 5/1989 | Ikegami et al. | 364/900 |
| 4,859,187 | 8/1989 | Peterson | 434/108 X |

OTHER PUBLICATIONS

Microsoft Multiplan for Apple Macintosh 1984, pp. 25–27.

*Primary Examiner*—Gary V. Harkcom
*Assistant Examiner*—Mark K. Zimmerman
*Attorney, Agent, or Firm*—Whitham & Marhoefer

[57] ABSTRACT

The automatic access of processes running on a computer is made possible by the display of graphic icons corresponding to the processes. A user can manipulate data in a table and then select a view function which results in the display of icons corresponding to potentially valid processes for the data in the table. By marking data in the table, the user causes only those icons corresponding to valid processes valid for the marked data to be displayed in a manner which allows selection of the icons. If the user then selects one of these icons, the system automatically makes the operation corresponding to the selected icon for the marked data. The user may then place the result of the operation on the display screen by dragging the selected icon to the desired location on the screen.

3 Claims, 8 Drawing Sheets

DIRECT MANIPULATION OF THE ICON TO PLACE THE RESULT IN THE DATA TABLE

FIG. 1 A DATA TABLE DISPLAYED IN A DISPLAY MENU
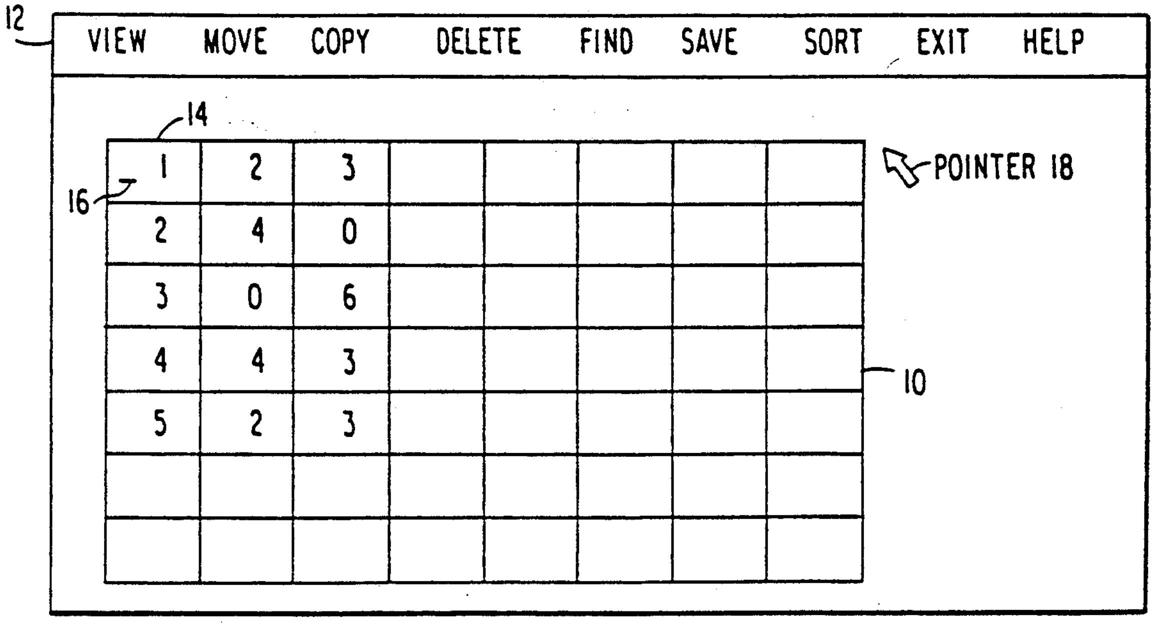
FIG. 2 THE DATA TABLE DISPLAYED WITH THE STATISTICAL ATTRIBUTE BAR
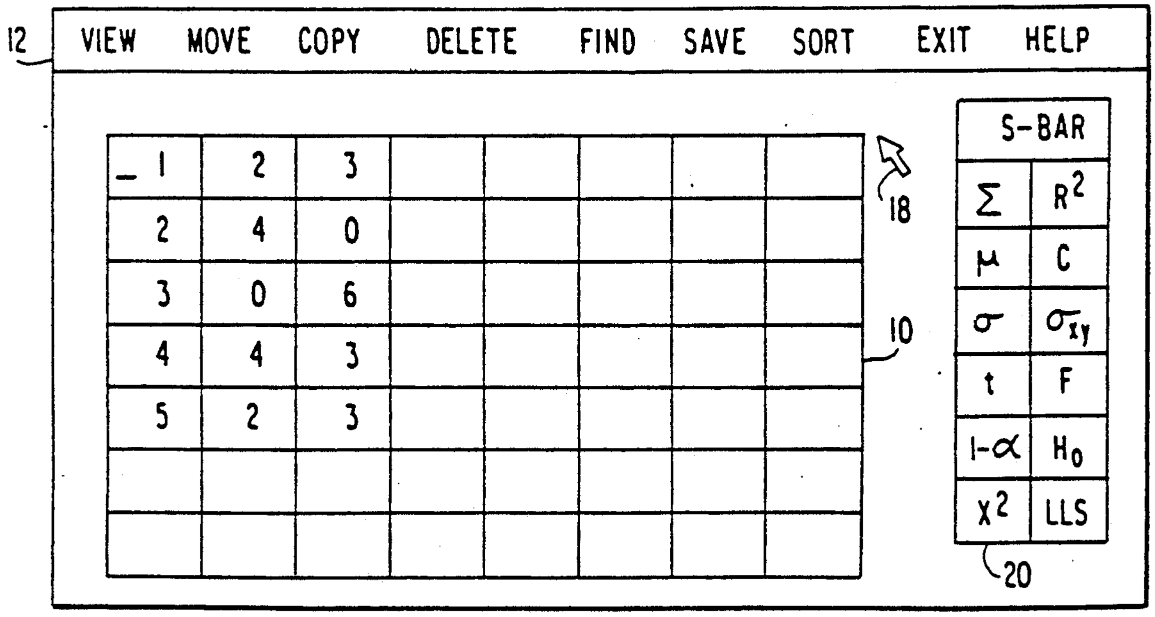

FIG. 3 A COLUMN IN THE DATA TABLE MARKED AND AN UPDATED STATISTICAL ATTRIBUTE BAR
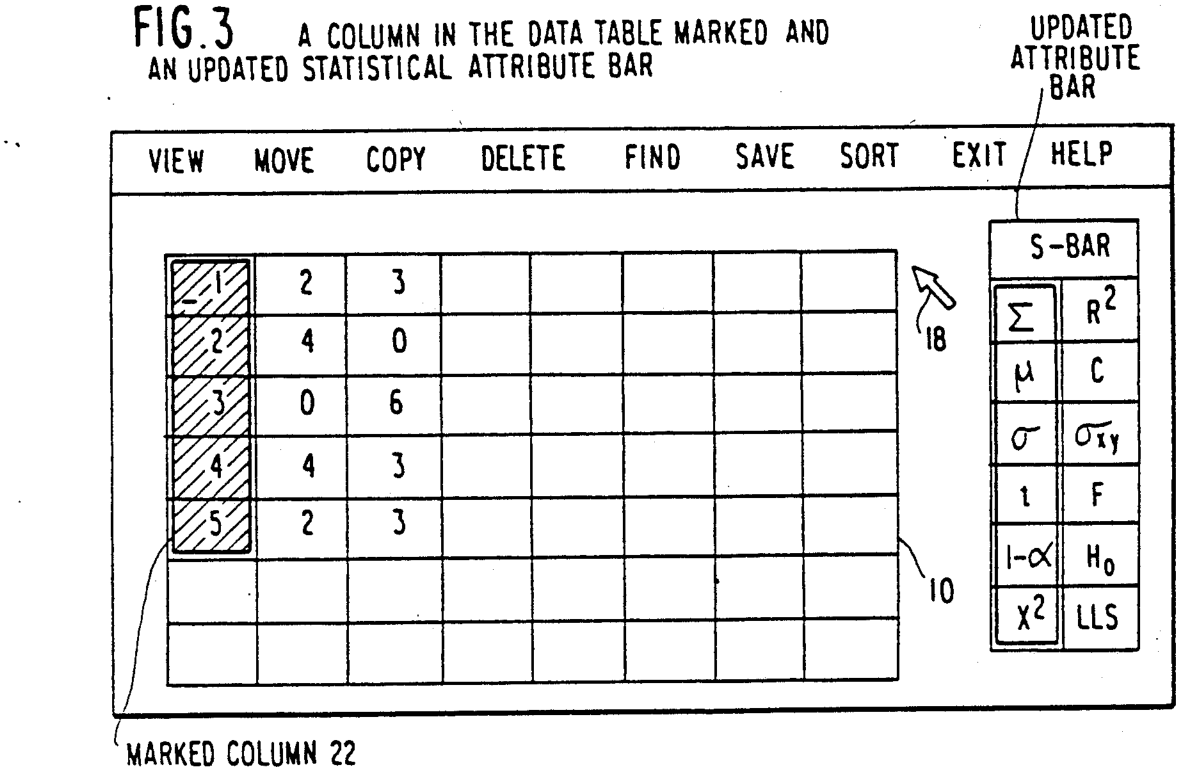
FIG. 4 SELECTION OF AN ICON FROM THE STATISTICAL ATTRIBUTE BAR
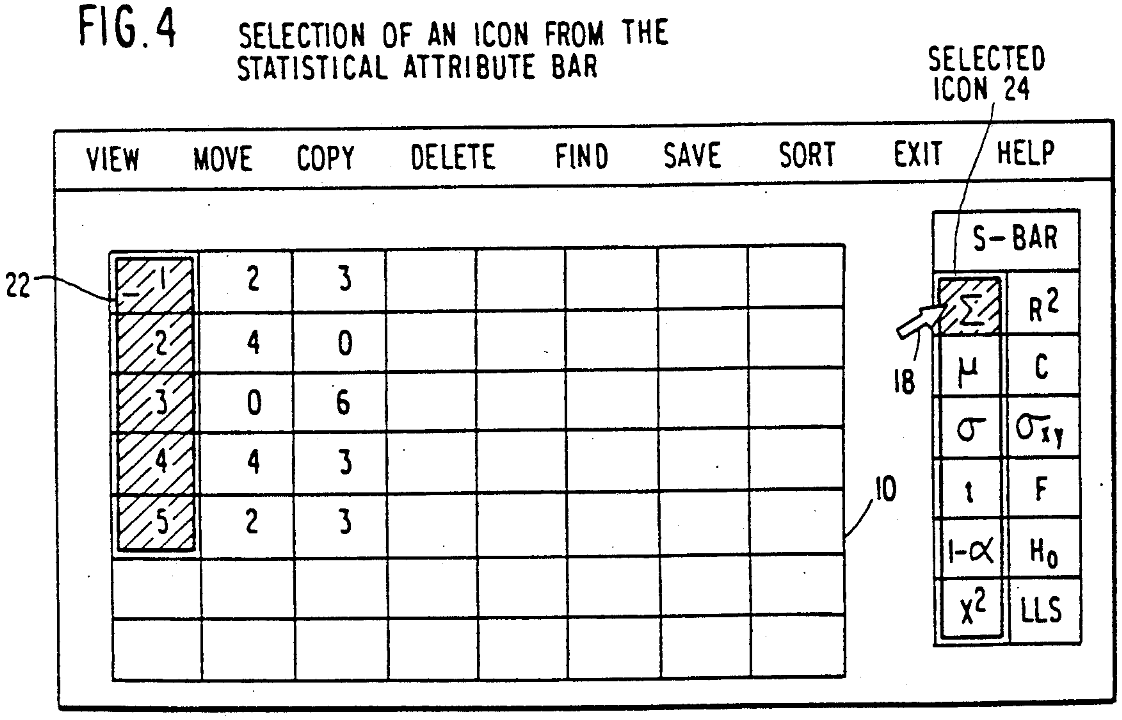

FIG. 5 DIRECT MANIPULATION OF THE ICON TO PLACE THE RESULT IN THE DATA TABLE
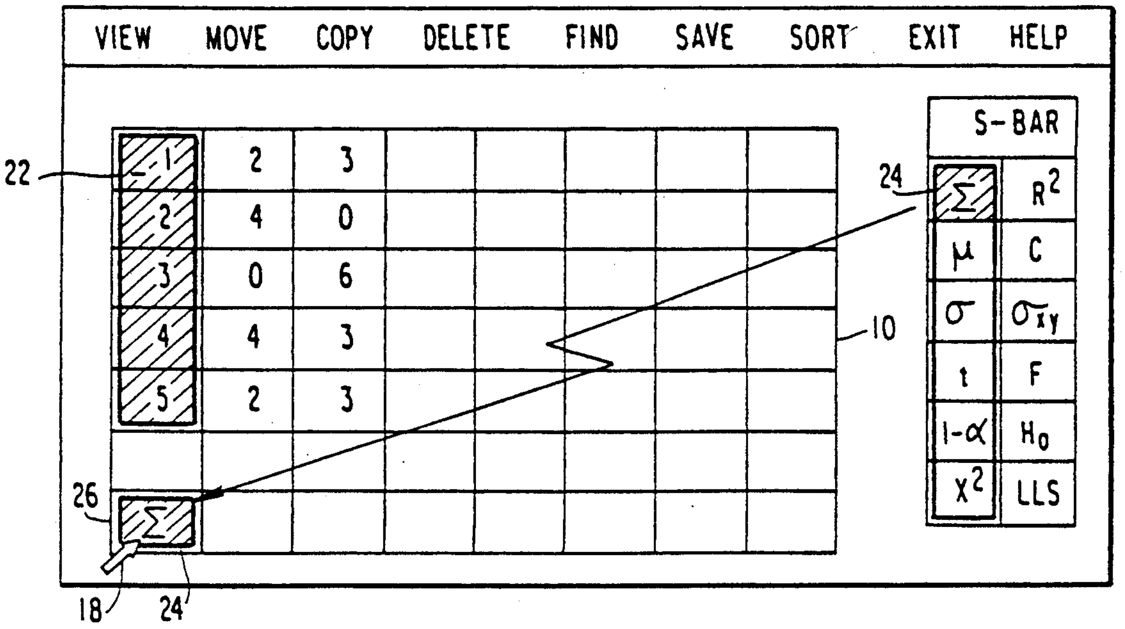
FIG. 6 THE STATISTICAL RESULT INSERTED INTO THE DATA TABLE
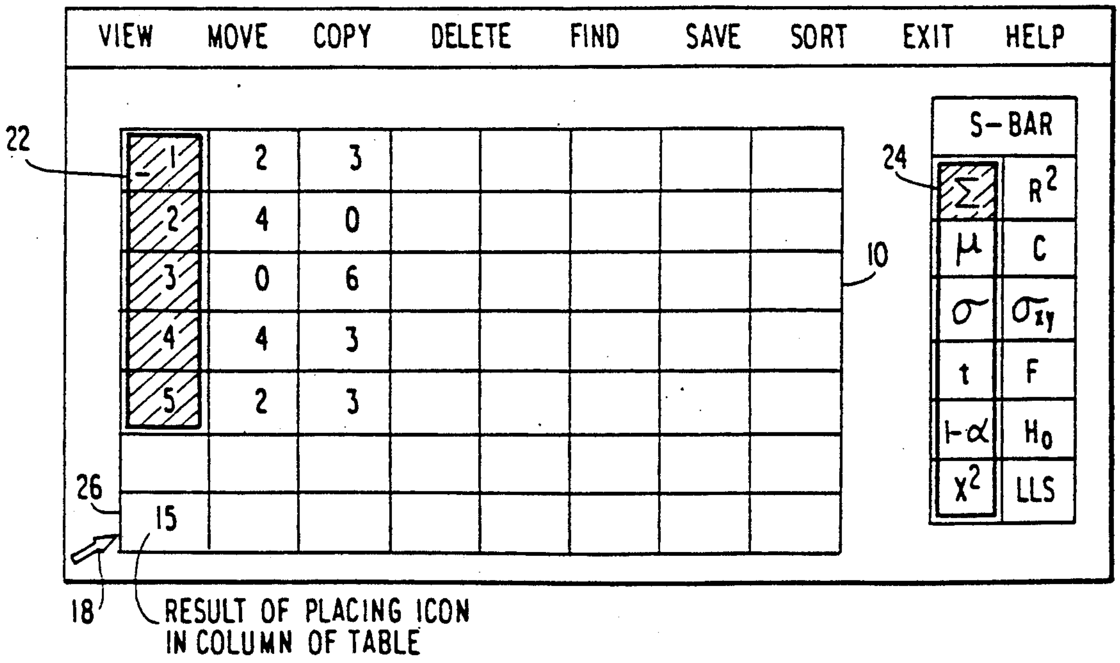

FIG. 8 DIRECT MANIPULATION OF THE ICON
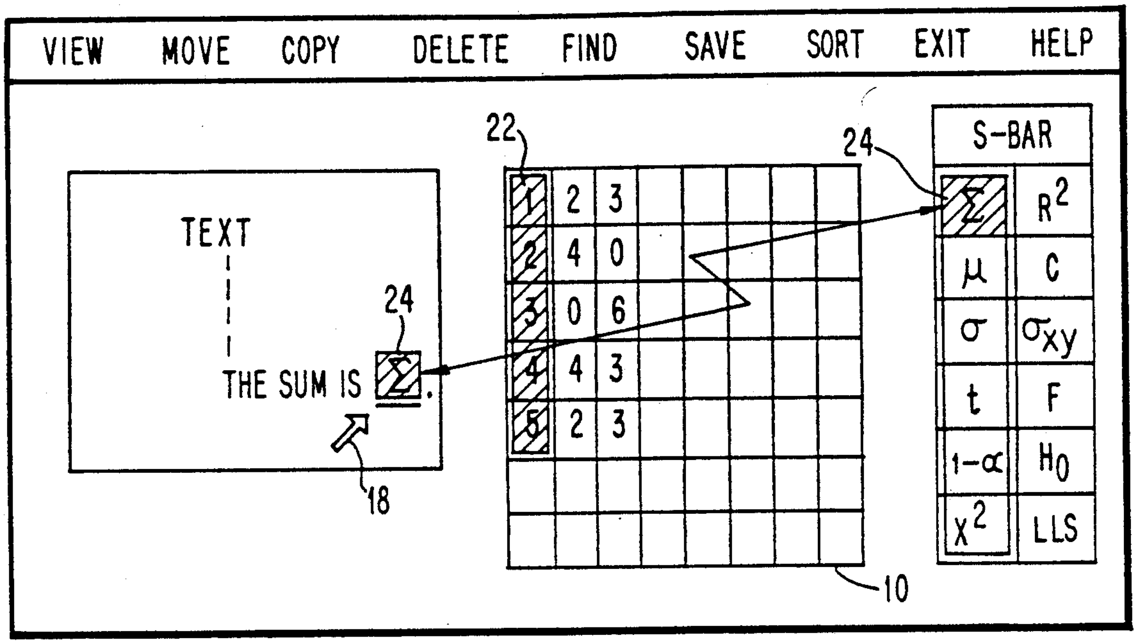
FIG. 9 THE STATISTICAL RESULT INSERTED
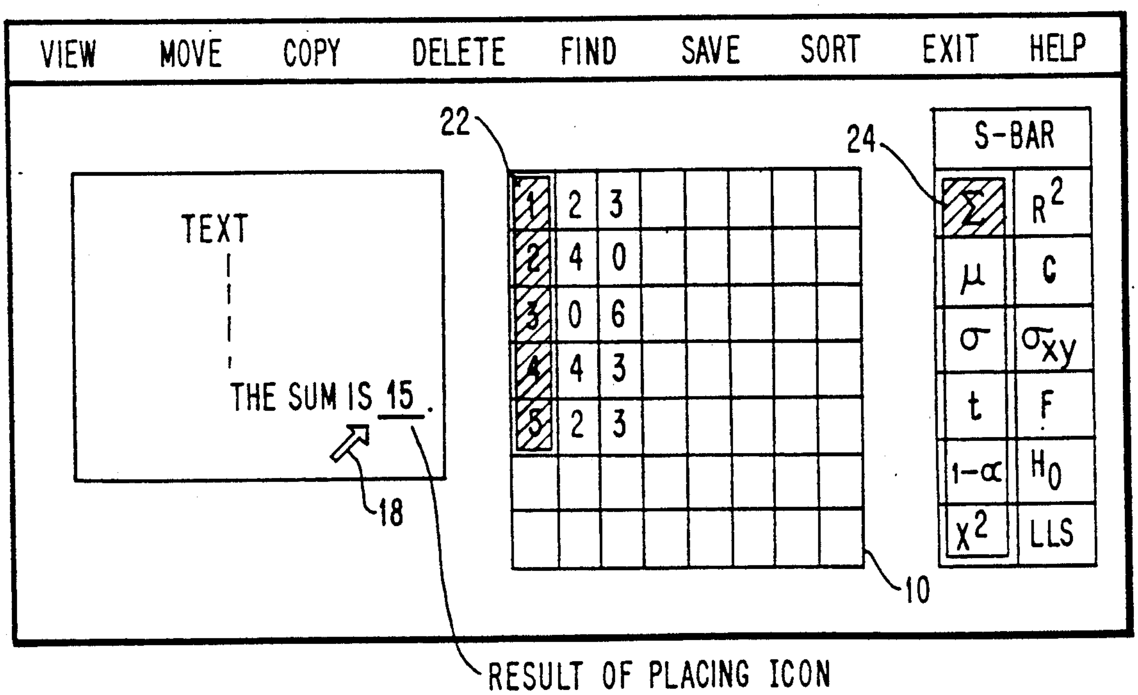

GRAPHICAL PROCESSING

CROSS REFERENCE TO RELATED APPLICATION

This application is a continuation-in-part of application Ser. No. 07/137,137, filed Dec. 23, 1987, entitled Graphical Statistical Processing, now abandoned.

BACKGROUND OF THE INVENTION

1. Field of the Invention

The present invention generally relates to a system for providing a processing function across multiple independent application programs running on a computer and, more particularly, to a technique for the automated access of processes via selection of a graphic icon while viewing and manipulating data.

2. Description of the Prior Art

In the prior art, there are various programs that allow users to develop data structures. For example, users have access to programs for organizing data into spreadsheets, matrices, vectors, graphics, or other forms of data which have a relationship based upon their organization. For example, some programs allow users to invoke statistical processing capabilities on designated collections of data. Examples of such statistical computations include totals, arithmetic means, standard deviations, and so forth. Users can then attach the statistical data to the table for purposes of reporting results.

All known current approaches have several problems from the user's point of view. First, access of certain programs is typically hidden from the user. Second, once accessed, the programs are difficult to learn, use and remember. Third, access to certain computations is limited to specific programs, as opposed to having more general access and use in other applications. Fourth, the available interaction style for certain programs are inconsistent with the base interaction style of other programs in the computer system.

The impact of these problems with current implementation is that extra time is required for users to learn how to use some programs. The inconsistency between interaction styles of these and other conventional computer programs causes learning problems and user errors. Additionally, the access to these functions is typically limited to the more experienced users of the programs, as opposed to having a broader and easier access for casual and novice users who also need the function. The current approaches do not aid even the most experienced user to perform the function that is desired; i.e., perform quick analyses of data of different types and in different locations in the data structure.

SUMMARY OF THE INVENTION

It is therefore an object of the subject invention to provide a unique method and system for the visual presentation of potentially valid computations for a set of data via a graphical icon display.

It is another object of the instant invention to provide a technique for the visual presentation of valid computations for a specifically selected set of data.

It is a further object of the present invention to provide for the automatic computation of results based upon selection of a set of data and a valid statistical process.

It is yet another object of the invention to provide a system for the direct visual selection and manipulation of statistical results via icon selection and movement.

One additional object of the invention is to present a potential valid icon for a set of data based on an organizational relationship of data in the set.

It is still a further object of the invention to provide for the direct visual placement of a result at a desired display location either with the data or at another location on a display screen.

Still another object of the invention is the provision of a technique for the automatic updating of results based upon changes in data input by the user.

According to the invention, the automatic access, processing and displaying of computations is simplified and rendered dynamic and interactive for the user thereby facilitating the completion of the task being performed. The user need not be capable of performing the various computations and tests as the computation of values of data is performed automatically and under system control based upon user selection of data objects and user selection of graphic icon representations of valid processes for the data. Statistical results are displayed automatically under system control in response to the user performing a "grab and drag" operation on an icon for the desired result and placing the icon in the desired display location. Improved processing of data is thus facilitated by permitting the user to view a collection of valid processes side-by-side with the data the user is viewing and manipulating. The user can choose to view the result by selecting the desired statistical process from a graphic icon display representing valid choices based on an organizational relationship of the data and "dragging" the icon for the statistical process to the body of the data display.

The benefits of the invention include user enhanced learning of the functions of the computer system by having visual presentation of system supported processes and computations. The user is not required to memorize computer procedures or input a complex series of keystrokes in order to invoke the functions of the invention. This makes those functions accessible to novice and casual users as well as to more experienced and sophisticated users, and no matter what the skill level of the user, errors are reduced as a result of the visual interface which allows only the selection of valid options for selected sets of data.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 1 is an illustration of a computer display screen showing a typical data set in a table format;

FIG. 2 is an illustration of the computer display screen of FIG. 1 showing the addition of a statistical attribute bar for selection of valid statistical processing associated with the data in the table;

FIG. 3 is an illustration of the computer display screen of FIG. 2 showing the result of a marking action of data in the table and its consequent effect on the statistical attribute bar;

FIGS. 4, 5 and 6 are each illustrations of the computer display screen in sequence 3 showing, respectively, the selection of a statistical icon from the icon menu, the placing of the selected icon in the table, and the result of the statistical computation;

FIGS. 8 and 9 are illustrations of a computer display screen, similar to FIGS. 5 and 6, illustrating an embodiment of the invention in which the results of a computation on data in one window are placed in a different window.

DETAILED DESCRIPTION OF A PREFERRED EMBODIMENT OF THE INVENTION

Figure 7A:
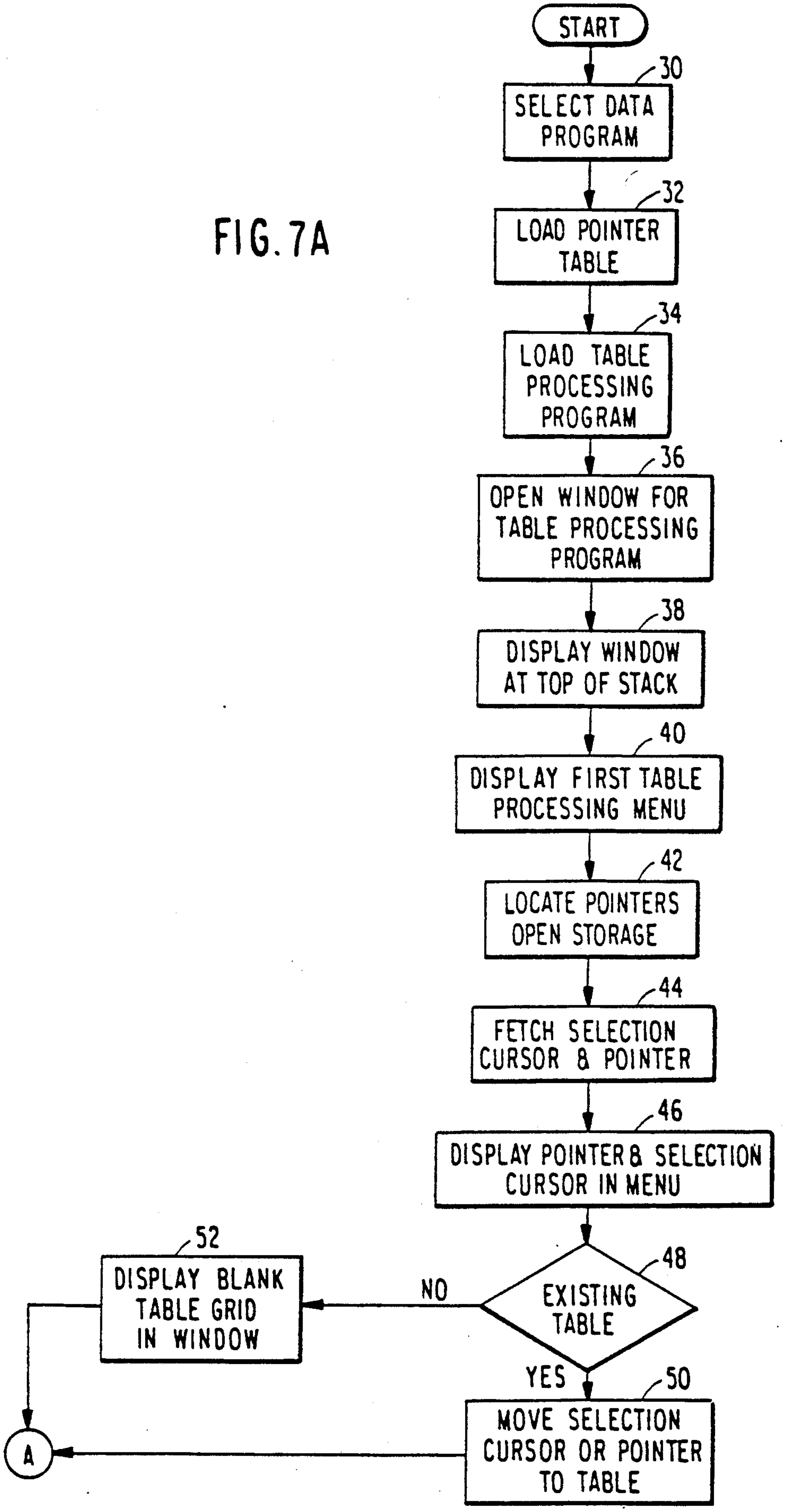
FIGS. 7A–C are a flow chart illustrating the logic of the internal system functions required to implement the embodiment of the invention described in FIGS. 1–6.

The description of the invention will be aided by certain definitions of terms. Presentations of information and/or selections to users on a computer display device are called menus. All programs which run on a computer system have one or more such menus. The selections provided in a menu may lead to other menus or contain other information for data entry or manipulation. The sequence of menus that a user traverses in the course of running a computer program is referred to as a menu hierarchy.

An object attribute is a characteristic of a computer system entity. All objects have attributes. Data in tables and other organizational structures have statistical attributes; e.g., arithmetic means, standard deviation, sum, regression coefficients and the like. These statistical attributes typically have symbolic representations as indicated below:

Sum = $\Sigma$
Mean = $\mu$
Standard Deviation = $\sigma$
Regression Coefficient = $R^2$ The visual presentation of object attribute information via icons is called an attribute bar. Attribute bars typically have been used for selection of colors, input modes and input styles in graphic drawing programs.

The "statistical attribute bar" used in the preferred embodiment of the invention is a technique for the graphical representation and presentation by means of icons of valid statistical processes associated with numeric data. Users can select a graphic icon representation of a statistical process, and the value of the statistical process is automatically computed. The user can also "drag" the icon and place it at a desired location for displaying the computed statistical value in the data table or other location on the display screen.

The most common operations using the statistical attribute bar are inputting data into some data structure, automatically displaying the valid statistical attributes associated with the collection of data, marking a subset of the data to view the valid statistical attributes associated with the subset, selecting a valid statistical icon from the statistical attribute bar, dragging the icon to a display position on the screen, and repeating one or more of the above steps as may be required by the user.

The preferred implementation of the invention is on a personal computer, such as the IBM Personal System/2 family of computers. The computer should include a bit mapped or all points addressable (APA) graphics display an a mouse or other pointing device as the preferred selection mechanism. The personal computer system is provided with a display management system, a multitasking environment, and a windowing system to support multitasking with multiple application programs. These requirements are provided with, for example, Microsoft's Windows TM program. The windowing system supports the use of a command bar for selection of actions, as well as supporting multiple scrollable areas within each window.

Software applications supported include data definition processors for contructing data storage structures which contain the numeric data to be processed. Statistical processing applications are available for computation of the statistical attributes of the data contained in the data structures. Graphic presentation routines are provided in order to display the representations of the statistical attributes in graphical icon form. Those skilled in the art will recongnize that all the system requirements listed above are conventional and well known in the art; therefore, details of these system requirements will not be discussed further.

Referring now to the drawings, and more particularly to FIG. 1, there is shown an example of a data table 10 displayed in a window. The window has a conventional command bar 12 for selection of actions to apply to the table and its content. The window is itself displayed on the computer screen. The table 10 is displayed with a grid indicating columns, rows and cells, the latter being the intersections of columns and rows. The table 10 also contains three columns of user data. The first cell 14 of the table shows a keyboard cursor 16 indicated by the single underline, and this cursor would typically be used to move from cell to cell, by means of the arrow keys on the computer keyboard, for the inputing and editing of data in the table. At the upper right hand corner of the table there is shown a pointing cursor 18 in the form of an arrow. This cursor is controlled by a pointing device such as a mouse and can be positioned at any point on the display screen, including the table 10 and the command bar 12. In the latter case, the arrow symbol disappears and one of the command functions is highlighted by reverse video, for example, to show the user the current position of the pointing cursor. The procedure for moving the pointing cursor is to physically move the mouse in the desired direction. The mouse typically has one or more buttons which can be pressed to indicate to the computer a user input selection.

FIG. 2 shows the result of displaying the statistical attribute bar 20. The statistical attribute bar 20 was displayed via a selection on the command bar 12, e.g., View, or by pressing a key sequence on the keyboard, e.g., Alt+S for view "statistical attribute bar". The statistical attribute bar 20 displays, in the form of icons, statistical attributes associated with data in the table as a whole and as collections of data as, for example, columns or rows of data. The statistical attribute bar 20 can be implemented as a scrollable viewport in order to display more data attributes than can be shown on the display device at one time. Scrolling would be indicated by the use of scroll bars within the viewport. Besides scrolling the statistical attribute bar 20, the user can also scroll the data table 10 separately from the attribute bar.

FIG. 3 shows the effect of the user having marked a column 22 of data in the table 10 via conventional marking techniques with the pointing cursor, for example. The column 22 is shown highlighted as by drawing a bright line around the column. The statistical attribute bar 20 updates automatically and under system control to indicate by highlighting as by drawing a bright line around the icons corresponding only to the valid statistical processes associated with the marked column 22 of data. The user can still perform other actions at this time. For example, the user can add or update data in the cells of the column 22, and the user can perform other editing functions including move, copy or delete the column.

FIG. 4 shows selection of an icon 24 from the statistical attribute bar 20. In the illustrated case, the user has selected the "sum" icon from the attribute bar 20 by moving the pointing cursor 18 to the icon 24 representing the statistical process for summing and pressing a button on the mouse to indicate the selection. When the pointing cursor 18 is placed on the icon 24, the icon is highlighted by reverse video to show the user the statistical process that would be selected by pressing the button on the mouse. Only those icons corresponding to valid statistical operations for the marked data can be selected so that even if the user moves the pointing cursor 18 to one of the icons not within the marked outline of valid icons, that icon will not be highlighted and can not be selected.

FIG. 5 shows the direct manipulation of the icon 24 from the statistical attribute bar using the pointing cursor 18 and a "press and hold" operation of the mouse button, for example, to "drag" a copy of the icon 24 to a desired display point. In the illustrated example, the user drags the icon across the table and into a cell 26 in the column 22 of the table 10. The user could just as easily have moved the icon to another position on the display, including another window supporting a different application program.

FIG. 6 shows the final result of the operation. The user, having positioned the sum icon 24 in the table using the pointing cursor 18, released the mouse button causing the result of the statistical computation to be displayed in the cell 26. Further operations on the data in the marked column 22 automatically result in an update of the sum in cell 26. The column 22 of data may remain shown as marked in case further operations are desired, and the statistical attribute bar 20 continues to show valid operations for the column 22. The sum icon 24 may also be shown as selected in case the user wishes to repeat the operation for another column. Both the column 22 and sum icon 24 can be deselected via conventional deselection techniques, the result of which would be a return to the display shown in FIG. 2.

FIGS. 8 and 9 illustrate an operation of the invention in which the user desires to locate the result of the computation in a cell in a display screen window other than the window which contains the table 10. In this embodiment two windows may be displayed simultaneously; the window which contains table 10 and a second window 29, which may contain textual material, for example. The window which contains table 10 is initially the active window and the operation of marking the data in table 10 and the valid icon selection is the same as previously described in connection with FIGS. 1 through 4.

To place the result of the calculation in another window 29, as illustrated in FIG. 8, the icon 24 from the attribute bar is manipulated in the manner already described in connection with FIG. 5. But here it is dragged to a cell 31 in the window 29. Dragging the icon 24 via pointer 18 to window 29 makes window 29 current and transfers the computational data to that application.

FIG. 9 shows the final result of the operation. The user, having positioned the sum icon 24 in window 29, releases the mouse button causing the result of the valid computation to be displayed in cell 31 in a proper format for window 29.

Figure 7B:
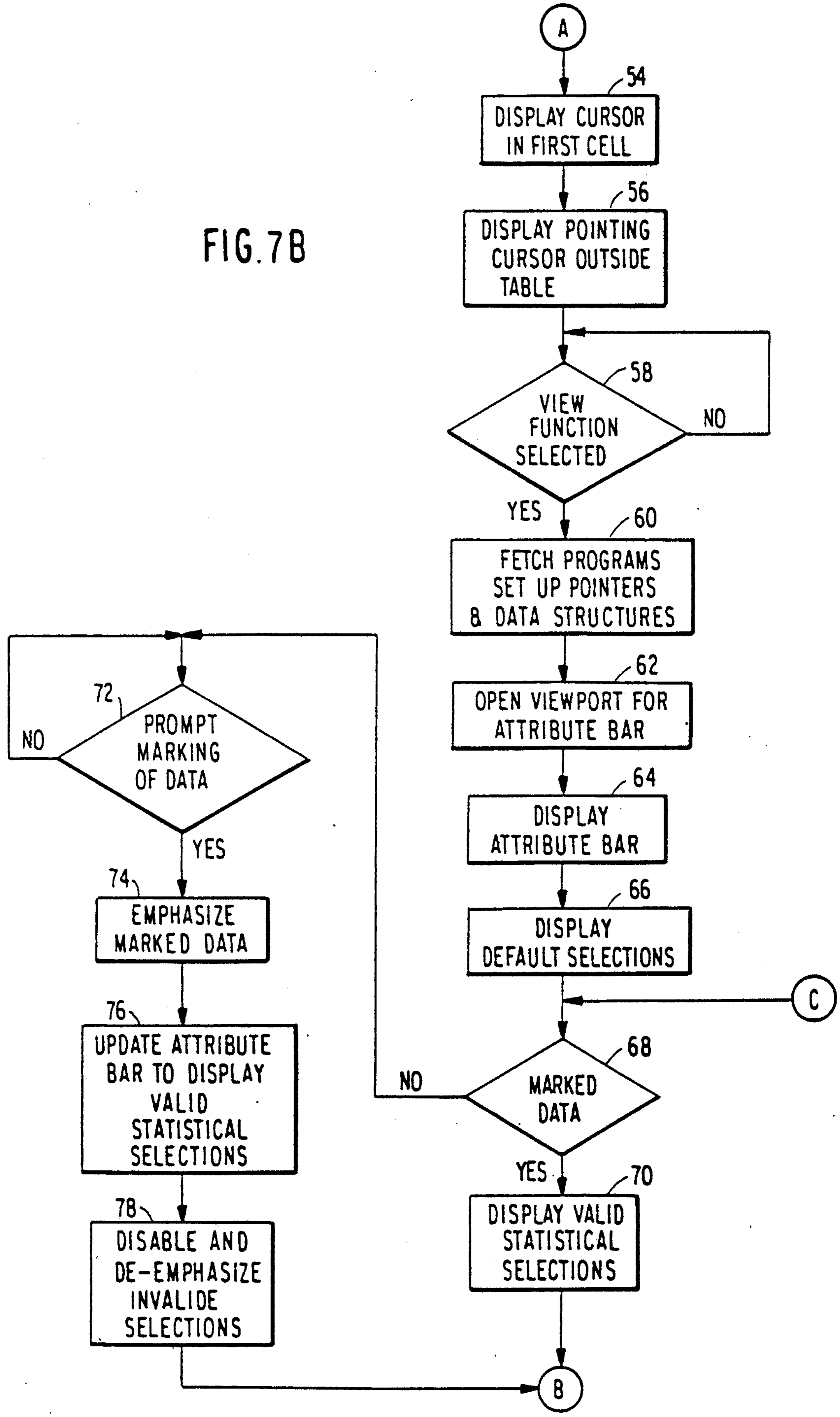

Reference is now made to the flow chart of FIG. 7 which shows the logic of the system functions required to implement the invention. The process starts with the selection of the data program from the main menu, as indicated in function block 30. Then, in function block 32, the table containing the pointers to storage locations for existing data tables and table processing programs are loaded and, in function block 34, the table processing program is loaded. Next, in function block 36, a window is opened to display the table processing program windows, the table processing window is displayed at the top of the window stack in function block 38, and the first table processing menu is displayed in that window in function block 40. The pointers are located and the storage required to support the statistical process in function block 42. The selection cursor and pointer are fetched in function block 44, and the pointer and selection cursor are displayed in the menu in function block 46. A test is then made in decision block 48 to determine if a previously existing table has been selected. If so, the selection cursor or pointer is moved to the table to be processed in function block 50. Selection is accomplished by pressing the Enter key and results in erasing the content of the menu, locating the format for the filled in table, locating data for selection from the menu, and displaying data in the grid in the window. On the other hand, if a previously existing table has not been selected, the content of the menu is erased, the format for a blank table is located, and a blank table grid is displayed in the window in function block 52. In either case, the cursor is displayed in the first cell 14 of the table 10 in function block 54, and the pointing cursor 18 is displayed on the outside of the table in function block 56. At this point, the display is essentially as shown in FIG. 1. It will, of course, be understood that if a previously existing table is not selected, the grid shown in FIG. 1 would be empty.

Now, the system monitors the user input to determine if the view function is selected in the command bar 12 at the top of the screen, as indicated by decision block 58. If the view function is selected, programs are fetched and pointers and storage structures are set up to support the selected function in function block 60. Then, a viewport is opened in function block 62 for the statistical attribute bar inside the data window, and in function block 64, the attribute bar 20 is displayed in the data window adjacent the table 10. The default selections in the attribute bar are displayed in function block 66. At this point, the display screen appears as shown in FIG. 2. The system then makes a test in decision block 68 to determine if data in the table has already been marked. If so, only the valid statistical selections for the marked data are displayed in function block 70. Otherwise, the system monitors user input to mark data in the table in decision block 72. When data is marked, the marked data is highlighted in function block 74, the attribute bar 20 is updated in function block 76 to display only valid statistical selections for the data marked, and the invalid selections are disabled and de-emphasized in the attribute bar in function block 78. At this point, the display screen appears as shown in FIG. 3.

The system next monitors user input for the selection of an icon from the attribute bar in decision block 80. When an icon is selected, the selected icon is displayed with an enhanced emphasis in function block 82, the corresponding statistical processing routine is loaded in function block 84, and the statistical calculating routine is initiated in function block 86. The display screen appears as shown in FIG. 4. As described earlier, the calculation proceeds immediately without any further input from the user. Therefore, the system now monitors user input to detemine where the result of the calculation is to be displayed. This is done by testing for a "press and hold" operation in decision block 88, and when this operation is detected, the pointing cursor and the selected icon are displayed in a manner to indicate that they are in the "press and hold" mode in function block 90. This is followed by the system monitoring the user input in decision block 92 to detect a "drag" operation with the pointing device. When the "drag" operation is detected, the icon is shown being moved across the window in the desired direction attached to the pointing cursor, as indicated in function block 94 and shown in FIG. 5. During this operation, the system monitors the user input to determine if the a release has been made from the press and hold and drag operations, as indicated in function block 96. When a release is detected, a test is made in decision block 98 to determine if the release is in the table. If so, then in function block 100, the statistical data is prepared for display in the table as shown in FIG. 6; otherwise, the statistical data is prepared for display in the proper format as determined by the application program. Then, the result of the statistical calculation is displayed in function block 104. If the calculation is not yet complete, the system can display an icon or message to the user indicating that the calculation is in progress, and then when the calculation is complete, the result is displayed at the indicated location. Finally, the system prompts the user in decision block 106 to enter whether to display again. If not, the icon is deselected in function block 108 before ending; but if so, control returns to decision block 68 to repeat the process.

Set out below is a program written in Program Design Language (PDL) from which a programmer skilled in the art can readily write source code in a computer language such as BASIC, Pascal or C supported by the computer. This program is usable by the computer in the navigation and interaction with the statistical attribute bar.

```
START
With start up of system
Load start up programs and operating system
Allocate memory for Program Pointer Table
Load Program Pointer Table
Initialize display buffers
Set up storage for Main Menu
Call FIND Menu program for Main Menu
Open window for Main Menu
Display Main Menu in window
Fetch cursor and pointer for Main Menu
Display pointer and cursor for Main Menu
Highlight first program on Main Menu
If Data Program selected from Main Menu, then
  Search Program Pointer Table for Data Program
  Allocate memory for Data Program, buffers, tables
  Load Data Program
  Initialize buffers and tables
  Call FIND MENU for initial Data Program menu
  Open window for Data Program Menu
  Place window on top of window stack
  Create list of existing data tables
  Update Data Program menu with list of tables
  Update display buffer with Data Program menu
  Call DISPLAY MENU program
  Display initial Data Program menu
  Fetch selection cursor and pointer
  Display cursor on first table in Data Program menu
  Display pointer adjacent to selection cursor
Load pointers to statistical programs
Allocate memory for statistical programs
Load pointers to existing data tables
CASE OF: Select existing data table
If selection cursor on existing data table, then
  Call HIGHLIGHT selection cursor
If select "View" existing data table action from command bar, then
  Allocate memory for selected table
  Call FIND MENU program for table display format
  Find data table in storage
  Create display buffer for data table
Call ERASE window content
  Call DISPLAY MENU program
  Display data table in Data Program window
  Display data cursor in first cell of table
  Display pointer adjacent to table
If select "View Statistical Attribute Bar", then
  Allocate memory for attribute bar
  Load attribute bar programs
  Call FIND MENU program for attribute bar display
    format
  Call TEST TABLE program to determine valid statistics
  Initialize attribute bar to state of current table
  Update display buffer for attribute bar image
  Display updated display buffer for table and attribute
    bar
  Display selection cursor in attribute bar
If table cells (columns and/or rows) selected via cursor
or pointer
  Call TEST TABLE program to determine valid statistics
  If valid statistics have changed, then
    Call UPDATE ATTRIBUTE BAR program
    Update display buffer for attribute bar image
    Display update table and attribute bar
If an Attribute Bar statistic icon is selected via cursor or
pointer
  Call HIGHLIGHT selection program
  Update display buffer for selection
  Display updated buffer for attribute bar
If pointer "press and hold" selected on attribute bar
  Call REPLACE POINTER program
  Display updated pointer (mouse pointer and selected
    icon)
If pointer moves with "press and hold" condition
  Call MOVE POINTER program
  Display updated pointer moving with pointer motion
If pointer "press and hold" is terminated
  Call SEARCH TABLE routine
  Determine parameters for input to statistics program
  Call COMPUTE STATISTIC program
  Create display format for statistic
  Update display buffer for statistical result
  Call REPLACE POINTER program
  Replace pointer-icon image with pointer image in
    display buffer
  Display statistical result in window
END
```

Figure 7C:
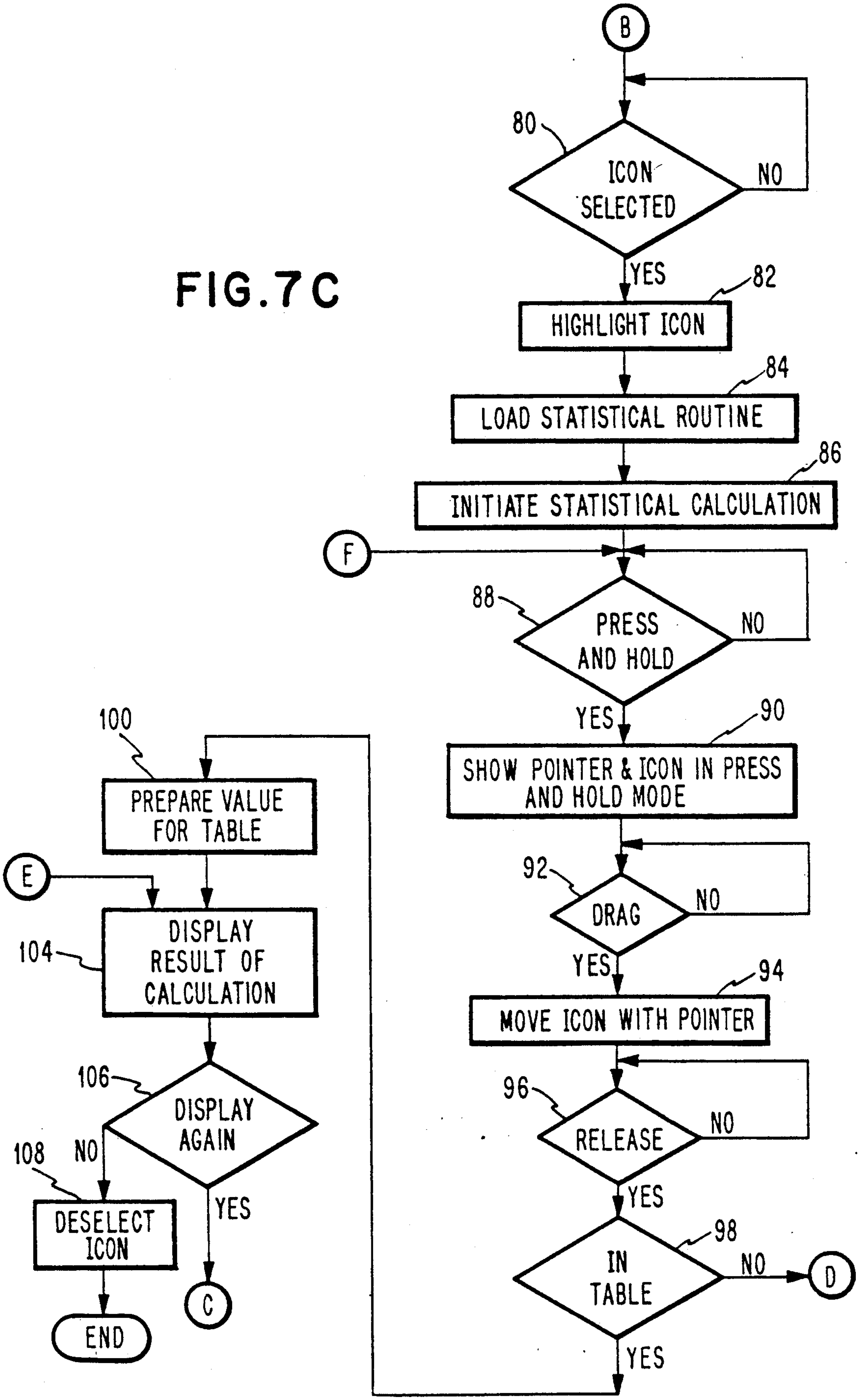
Figure 10:
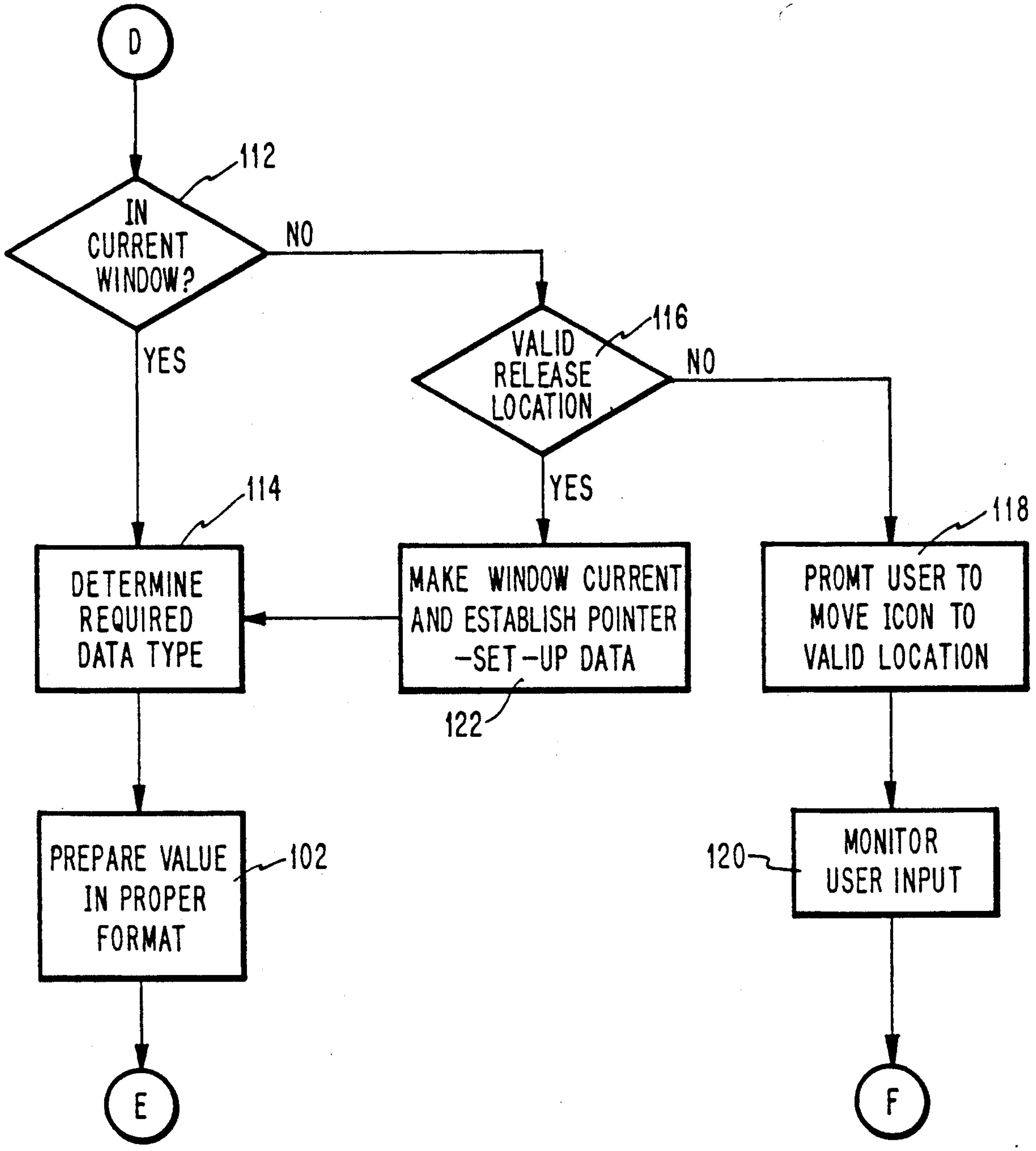
FIG. 10 is a flow chart illustrating the logics of the internal system functions to implement the embodiment of FIGS. 8 and 9.

The following are not expanded since they are handled by conventional techniques in the current art:

CASE OF: Create New Table
CASE OF: Delete, copy, move, print, etc part or all of a table
CASE OF: Update data in table and recompute statistics As shown in FIGS. 7C and 10, if the icon 24 is not positioned in the table 10, it is tested at block 112 to determine if it is positioned in a current screen. If it is positioned in a current screen display, the type of data required for the screen is determined, block 114, the data is formatted, block 102, and the operation proceeds as previously described in connection with FIG. 7C.

If the icon is positioned outside the window currently on the display screen, a check at 116 is made to see if it is positioned at a valid location. If not, the user is prompted to a valid location, blocks 118 and 120. If the location is valid, a program such as Microsoft Windows will make the window current where the icon is positioned and will establish the pointer 18 and the computational result in the application supporting this window, block 122. From here the operation proceeds as previously described.

While the invention has been described in terms of a single preferred embodiment, those skilled in the art will understand that the invention can be practiced with modification within the spirit and scope of the appended claims.

Having thus described my invention, what I claim as new and desire to secure by Letters Patent is as follows:

1. A method of accessing a computational process via selection of an icon while viewing data on a display screen comprising the steps of:
displaying icons representative of process commands;
monitoring a user input to select an icon;
monitoring a user input to drag a replica of the selected icon to a user determined position on the display screen; and
in response to said selection and dragging steps respectively performing the computational process represented by the selected icon and displaying a computed value determined by the computational process at the user determined position on the display screen.

2. A method of accessing a computational process via selection of an icon while viewing data on a display screen comprising the steps of:
displaying icons representative of computational process commands;
monitoring a user input to mark a subset of the data displayed on the display screen;
testing said marked subset of data to determine which of said process commands is valid for said marked subset;
marking on said display screen those icons for process commands determined to be valid on the basis of said test;
monitoring a user input to select an icon;
monitoring a user input to drag a replica of the selected icon to a user determined position on the display screen; and
in response to said selection and dragging steps respectively performing the computational process represented by the selected icon and displaying a computed value determined by the computational process at the user determined position on the display screen.

3. A method of accessing a process via selection of an icon while viewing data running as a first task in a first window on a display screen comprising the steps of:
displaying icons representative of process commands;
monitoring a user input to select an icon;
monitoring a user input to drag a replica of the selected icon to a user determined position on the display screen in a second window running a second task; and
in response to said selection and dragging steps respectively performing the process represented by the selected icon and displaying a value determined by the process represented by the selected icon at the user determined position in the second window running as a second task on the display screen.

* * * * *